W. P. SMITH.
INSERTIBLE SAW TOOTH.
APPLICATION FILED DEC. 5, 1917.
1,294,554.
Patented Feb. 18, 1919.
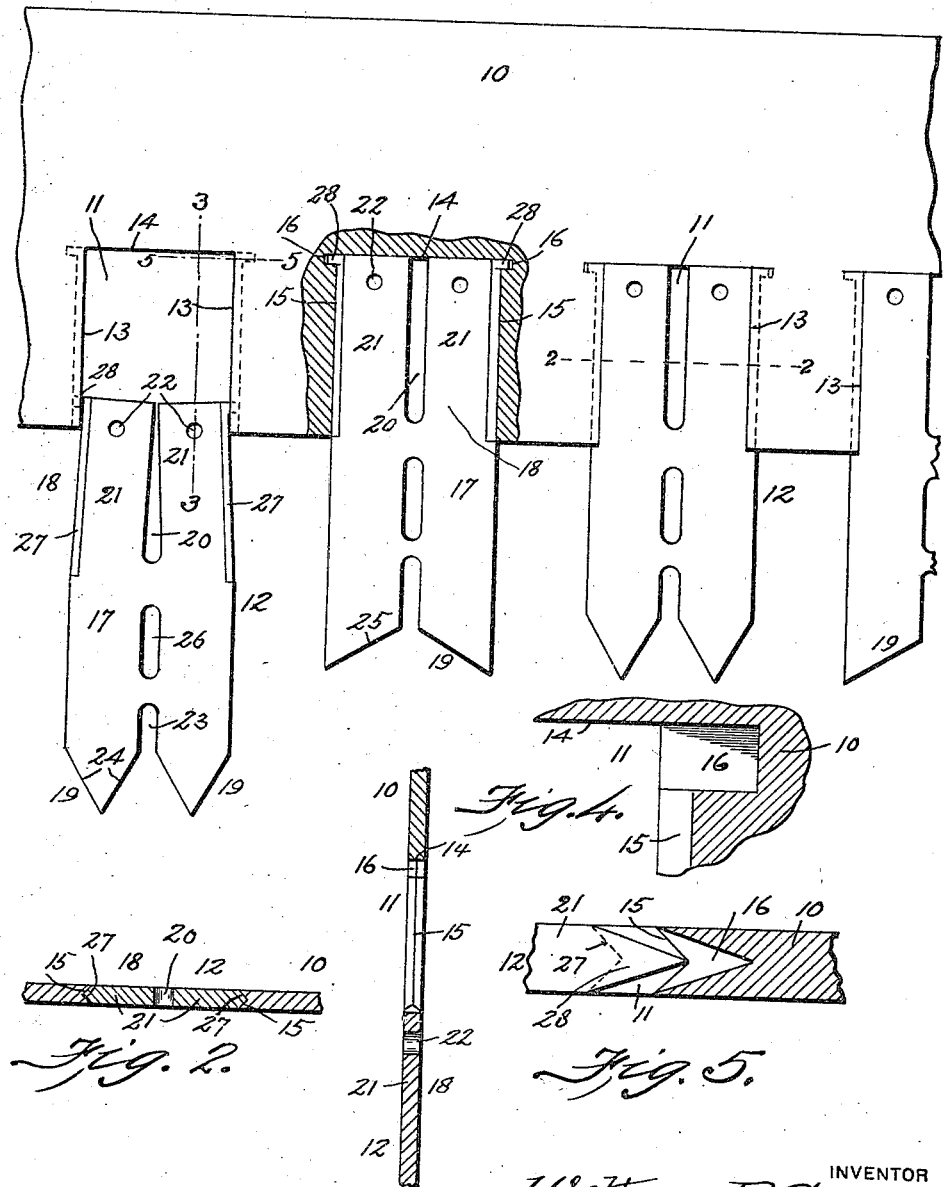

UNITED STATES PATENT OFFICE.

WALTER P. SMITH, OF REFORM, ALABAMA.

INSERTIBLE SAW-TOOTH.

1,294,554. Specification of Letters Patent. Patented Feb. 18, 1919.

Application filed December 5, 1917. Serial No. 205,546.

*To all whom it may concern:*

Be it known that I, WALTER P. SMITH, a citizen of the United States, residing at Reform, in the county of Pickens and State of Alabama, have invented certain new and useful Improvements in Insertible Saw-Teeth, of which the following is a specification.

This invention relates to an improvement in saws and particularly to insertible teeth for cross cut, circular and other saws, and has for its object to provide teeth for ready insertion in and removal from saw blades, said teeth being preferably made from sheet steel cut or stamped to shape and provided with integral means for securing them in recesses formed in the cutting edges of saw blades. These teeth are so constructed that when inserted in the recesses of the saw blade, they will, through resiliency of the tangs of the teeth, be firmly and securely held in place and cannot through use, however rough, be removed from their seats.

With this object in view the invention consists in the novel construction, combination and arrangement of parts hereinafter described, pointed out in the appended claims, and illustrated in the accompanying drawings in which:

Figure 1 is a side elevation of a portion of a saw blade with several of the improved teeth mounted therein, Fig. 2 is a cross sectional view through one of the teeth and a portion of the blade on the line 2—2 of Fig. 1, Fig. 3 is a similar view on the line 3—3 of the same figure.

Fig. 4 is an enlarged detailed sectional view of the saw blade at the corner of one of the recesses in which the saw tooth is seated, and Fig. 5 is an enlarged detailed sectional view through the same part on the line 5—5 of Fig. 1.

In the drawings, 10 indicates a portion of a saw blade, in the cutting edge of which are formed a number of recesses 11 in which are seated removable teeth 12. The recesses 11 are each of rectangular formation with parallel sides 13 perpendicular to the edge of the blade 10 and a straight bottom 14 perpendicular to said sides. The sides 13 of the recesses 11 are grooved for their entire length, the grooves 15 being preferably V-shaped in cross section as shown in Figs. 2 and 5. At the innermost end of each groove 15 adjacent the bottom 14 of the notch is a lateral V-shaped depression 16 extending laterally into the body of the saw blade 10 a short distance beyond the bottom of the groove, said depressions forming seats for the locking means carried by the saw teeth 12.

Each tooth 12 is made of steel cut or stamped from a sheet practically complete for use, each tooth comprising a body 17 and tang 18 and cutting elements 19.

The tang 18 of the saw tooth 12 has a length equal to the depth of the recess 11 and is formed with a central notch 20 open at one end of the tang, thus dividing the tang into two parts of fingers 21, each finger having a small opening 22 near the end to receive a suitable tool for the purpose of pressing the fingers 21 together when the tooth is to be inserted in the recess. The cutting end of the tooth is similarly notched for a short distance in the center as at 23 in line with the notch 20 thus forming two cutting members 19 on each tooth. The cutting members 19 may each be pointed by forming a double taper 24 on its lower end, two inclined or tapered portions meeting in the central line of the cutting member; or if preferred, each cutting member may be pointed by means of a single inclined edge 25 extending downwardly from the center of the tooth 12 to the outer edge thereof, both forms being shown in Fig. 1. The body 17 of the tooth may also be formed with a longitudinal notch 26 if desired.

The body 17 and tang 18 have their outer edges continuous and parallel from the cutting members 19 to the extremity of the fingers 21, each finger having a double bevel 27 on its outer edge extending throughout the length thereof, this edge being designed to fit firmly and tightly in the V-shaped groove 15 in the side of the recess 11. Projecting laterally from the outer end of each finger 21 at the free end thereof is a lug 28, the sides of which lugs are beveled as shown clearly in Fig. 4 and fit snugly and tightly when the tooth is in place in the depressions 16.

Constructed as described, the teeth 12 are inserted in the recesses 11 by pressing the fingers 21 together at their free ends, as shown at the extreme left of Fig. 1, a suitable tool having means insertible in the openings 22 being used for the purpose. The lugs 28 are sufficiently close together to slide freely along the V grooves 15 and when the ends of the fingers 21 abut against the bottom 14 of the recess 11 pressure on the inserting tool is released and the fingers 21 spring apart into their normal positions, causing their bevel edges 27 to enter the grooves 15 and the lugs 28 to fit into the depressions 16, the spring action of the fingers holding the tooth in place with great firmness and rigidity. The lugs 28 prevent the tooth being withdrawn in longitudinal direction from the recess while the beveled edges 27 maintain the tooth in place against lateral pressure. The removal of the tooth is readily accomplished by pressing the fingers together and slipping the tooth from the recess.

Constructed as described, the teeth are retained in place without the assistance of other fastening means than such as are integral with the teeth and while simple in construction this fastening means forms a secure lock for retaining each tooth in its seat. It might be stated that after the tooth has been cut or punched from sheet metal, the only work required thereon to fit it for use is to bevel the side edges of the tang 18 and the lugs 28, and of course, grind and set the cutting members.

Having described my invention, I claim:

1. In combination with a saw blade or body having a plurality of rectangular notches in one edge, each notch having its side walls grooved from end to end and its bottom edge perpendicular to its side edges, and a V-shaped locking depression formed in the body of the saw at the bottom of each grooved edge perpendicular to said edge, of a number of saw teeth each insertible in a notch and having a tang formed of two parallel spaced resilient fingers bearing at their ends on the bottom of the notch, the outer edges of which are beveled or shaped in cross section to fit the grooved edges of the notch, and an outwardly projecting rectangular lug on the end of each finger the sides of which are beveled to fit snugly, said V-shaped depressions in the saw body to lock the tooth rigidly in place.

2. An insertible saw tooth comprising a body having cutting members on one end and a pair of spaced parallel fingers on the opposite end forming the tang of the tooth, each tooth having its outer edge beveled or made V-shape in cross section, and a lug projecting from the outer edge of each finger at the end thereof and beveled on the opposite sides to engage depressions of similar shape in a saw blade and hold the tooth immovable when the saw is in use.

In testimony whereof I affix my signature in presence of two witnesses.

WALTER P. SMITH.

Witnesses:
S. K. Dorroh,
J. W. Hollingsworth.

Copies of this patent may be obtained for five cents each, by addressing the "Commissioner of Patents, Washington, D. C."